United States Patent [19]
Kabe et al.

[11] Patent Number: 5,345,988
[45] Date of Patent: Sep. 13, 1994

[54] PNEUMATIC RADIAL TIRE FOR HEAVY LOADS

[75] Inventors: Kazuyuki Kabe, Hiratsuka; Hajime Tomoda, Kanagawa, both of Japan

[73] Assignee: The Yokohama Rubber Co., Ltd., Tokyo, Japan

[21] Appl. No.: 35,034

[22] Filed: Mar. 22, 1993

[30] Foreign Application Priority Data

May 27, 1992 [JP] Japan ................................. 4-134755

[51] Int. Cl.$^5$ ............................................. B60C 11/06
[52] U.S. Cl. ............................................. 152/209 R
[58] Field of Search ....................... 152/209 R, 209 D

[56] References Cited

U.S. PATENT DOCUMENTS

| 3,664,402 | 5/1972 | Montagne | 152/209 R |
| 3,831,654 | 8/1974 | Boileau | 152/209 R |
| 4,724,878 | 2/1988 | Kabe et al. | 152/209 R |
| 5,109,901 | 5/1992 | Miyamoto et al. | 152/209 R |

FOREIGN PATENT DOCUMENTS

| 0313361 | 4/1989 | European Pat. Off. |
| 2921377 | 12/1979 | Fed. Rep. of Germany |
| 0161605 | 9/1983 | Japan |
| 1254699 | 11/1974 | United Kingdom |

Primary Examiner—Michael W. Ball
Assistant Examiner—Nancy T. Krawczyk
Attorney, Agent, or Firm—Nikaido, Marmelstein, Murray & Oram

[57] ABSTRACT

A pneumatic radial tire for heavy loads, having steel belt layers provided on the inner side of a tread, and a tread pattern having a plurality of divisional ribs separated by a plurality of main grooves extending in the circumferential direction of the tire, characterized in that at least the inner vertical surfaces of left and right outermost main grooves out of the main grooves are formed so as to extend zigzag in the circumferential direction of the tire, narrow grooves which extend continuously in the circumferential direction of the tire being provided at the shoulder side edge portions of ribs internally adjacent to the outermost main grooves, the width $W_4$ of the narrow grooves being set to a level in the range of 0.5–1 mm, the axes of the narrow grooves which extend in the direction of the depth thereof being inclined in the downwardly inward direction with respect to a normal of the tread surface, the narrow grooves forming laterally separated rib bodies and narrow ribs the height of which is smaller than that of the rib bodies, a ratio of a maximum width $W_2$ of the narrow ribs to a total width $W_1$ of the ribs on the inner side of the outermost main grooves being set to a level satisfying the relation $W_2/W_1 \leq 0.3$, an angle $\alpha_1$ between the side surface which faces the relative outermost main groove of a maximum width portion of each narrow rib and a normal of the tread surface being set smaller than an angle $\alpha_2$ between the side surface which faces the relative outermost main groove of a minimum width portion of each narrow rib and the same normal.

4 Claims, 2 Drawing Sheets

PNEUMATIC RADIAL TIRE FOR HEAVY LOADS

BACKGROUND OF THE INVENTION

This invention relates to a pneumatic radial tire for heavy loads, used for trucks and buses and having a tread pattern based on a rib pattern, and more particularly to a pneumatic radial tire for heavy loads, capable of minimizing the occurrence of partial abrasion thereof and suitably used on a front wheel.

A rib pattern is inferior to a block pattern in the wheel driving characteristics but superior thereto in abrasion resistance. Accordingly, a rib pattern is used in many cases as a tread pattern of a radial tire on a front wheel (steering control wheel) of a heavy load vehicle, such as a truck and a bus. In recent years, the manufacturing of a softer suspension has been developed so as to improve the riding comfort of a truck and a bus, and, with the development of such a suspension, partial abrasion, such as shoulder dropping abrasion, rib punch, wavy abrasion and polygonal abrasion becomes apt to occur on the tread surface of a radial tire of a front wheel.

The pneumatic radial tires heretofore proposed as radial tires in which measures for preventing the occurrence of such partial abrasion are taken include a radial tire provided with narrow grooves in the outer edge portion of shoulder ribs as disclosed in Japanese patent application Kokai publication No. 63-134313, a radial tire provided with cuts in shoulder ribs as disclosed in Japanese patent application Kokai publication No. 61-235205, and a radial tire in which variety is given to the radius of the tread as disclosed in Japanese patent application Kokai publication No. 62-91303.

However, in these techniques, the effects in minimizing the occurrence of partial abrasion are unsatisfactory. Therefore, when wheels are not aligned accurately, various kinds of abrasion is liable to occur on the tread surface, so that the vehicle becomes unable to travel in many cases before the rated lifetime of the tire has terminated.

In view of the above, the inventors of the present invention analyzed in various ways the tires on which partial wear occurred, to discover that the construction of a tire had large influence upon the occurrence of partial abrasion. In a pneumatic radial tire for heavy loads, two to four steel belts are provided as belt layers, and the rigidity of the belt layers is extremely high. Therefore, when a tire having a tread pattern based on a rib pattern as mentioned above is charged with air to be inflated, the shoulders fall from inflection points mainly on the outermost main grooves. When the shoulders thus fall, a difference in diameter between the central portion of a tread and shoulders becomes large, and a dragging frictional force due to this diameter difference is exerted strongly on the shoulders, so that irregular partial wear becomes liable to occur, i.e., the shoulder ribs only are worn earlier.

A pneumatic radial tire for heavy loads has not only a problem of achieving the prevention of partial abrasion thereof but also a problem of improving the draining performance thereof which has close relation with the shape of the grooves formed therein.

SUMMARY OF THE INVENTION

An object of the present invention is to provide a pneumatic radial tire capable of effectively minimizing the occurrence of irregular partial abrasion thereof, i.e. earlier abrasion of shoulder ribs along, and improving the draining performance thereof.

To achieve this object, the present invention provides a pneumatic radial tire for heavy loads, having steel belt layers provided on the inner side of a tread, and a tread pattern having a plurality of divisional ribs separated by a plurality of main grooves extending in the circumferential direction of the tire, characterized in that at least the inner vertical surfaces of left and right outermost main grooves out of these main grooves are formed so as to extend zigzag in the circumferential direction of the tire, narrow grooves which extend continuously in the circumferential direction of the tire being provided at the shoulder side edge portions of ribs axially inward and adjacent to these outermost main grooves, the width $W_4$ of these narrow grooves being set to a level in the range of 0.5–1 mm, the axes of the narrow grooves which extend in the direction of the depth thereof being inclined in the downwardly inward direction with respect to a normal of the tread surface, the narrow grooves forming laterally separated rib bodies and narrow ribs the height of which is smaller than that of the rib bodies, a ratio of a maximum width $W_2$ of the narrow ribs to a total width $W_1$ of the ribs on the inner side of the outermost main grooves being set to a level satisfying the relation $W_2/W_1 \leq 0.3$, an angle $\alpha_1$ between the side surface which faces the relative outermost main groove of a maximum width portion of each narrow rib and a normal of the tread being set smaller than an angle $\alpha_2$ between the side surface which faces the relative outermost main groove of a minimum width portion of each narrow rib and the same normal.

Narrow grooves extending continuously in the circumferential direction of the tire are thus provided at the shoulder side edge portions of the ribs axially inward and adjacent to the outermost main grooves, whereby the variation of rigidity of the tread in the widthwise direction thereof is set moderate so as not to form inflection points in the outermost main grooves. As a result, a difference in diameter between a central portion and shoulder portions occurring during inflation can be minimized, and a dragging frictional force exerted on the shoulder portions due to the diameter difference can be reduced. Moreover, rib bodies and narrow ribs separated from the rib bodies by the above-mentioned narrow grooves and formed to a height smaller than that of the rib bodies are provided, and the width of the narrow ribs is varied zigzag in the circumferential direction of the tire so as to maintain a suitable level of rigidity thereof, whereby an abrasion promoting force can be concentrated on the narrow ribs. Accordingly, owing to a combined effect of the reduction of the dragging frictional force exerted on the shoulders and the concentration of an abrasion promoting force on the narrow ribs, the partial abrasion, such as the shoulder dropping abrasion of the tire can be minimized. Since the axes of the narrow grooves which extend in the direction of the depth thereof is inclined in the downwardly inward direction of the tire, the narrow ribs have a larger thickness at the base end portions thereof and becomes difficult to be dropped.

The narrow ribs extend in a stepped manner from the rib bodies, and drain passages are secured by the clearances formed by the stepped portions. An angle $\alpha_1$ between the side surface which faces the relative outermost main groove of a maximum width portion of each narrow rib and a normal of the tread surface is set smaller than an angle $\alpha_2$ between the side surface which faces the relative outermost main groove of a minimum width portion of each narrow rib and the same normal. Therefore, a tangential line on which a zigzag side surface of each outermost main groove meets the bottom surface thereof can be extended linearly, and the draining performance of the tire can be improved.

DESCRIPTION OF THE PREFERRED EMBODIMENTS

A most preferred embodiment provided with five ribs on a tread surface will now be described but the number of ribs on the pneumatic radial tire according to the present invention is not specially limited.

Figure 1:
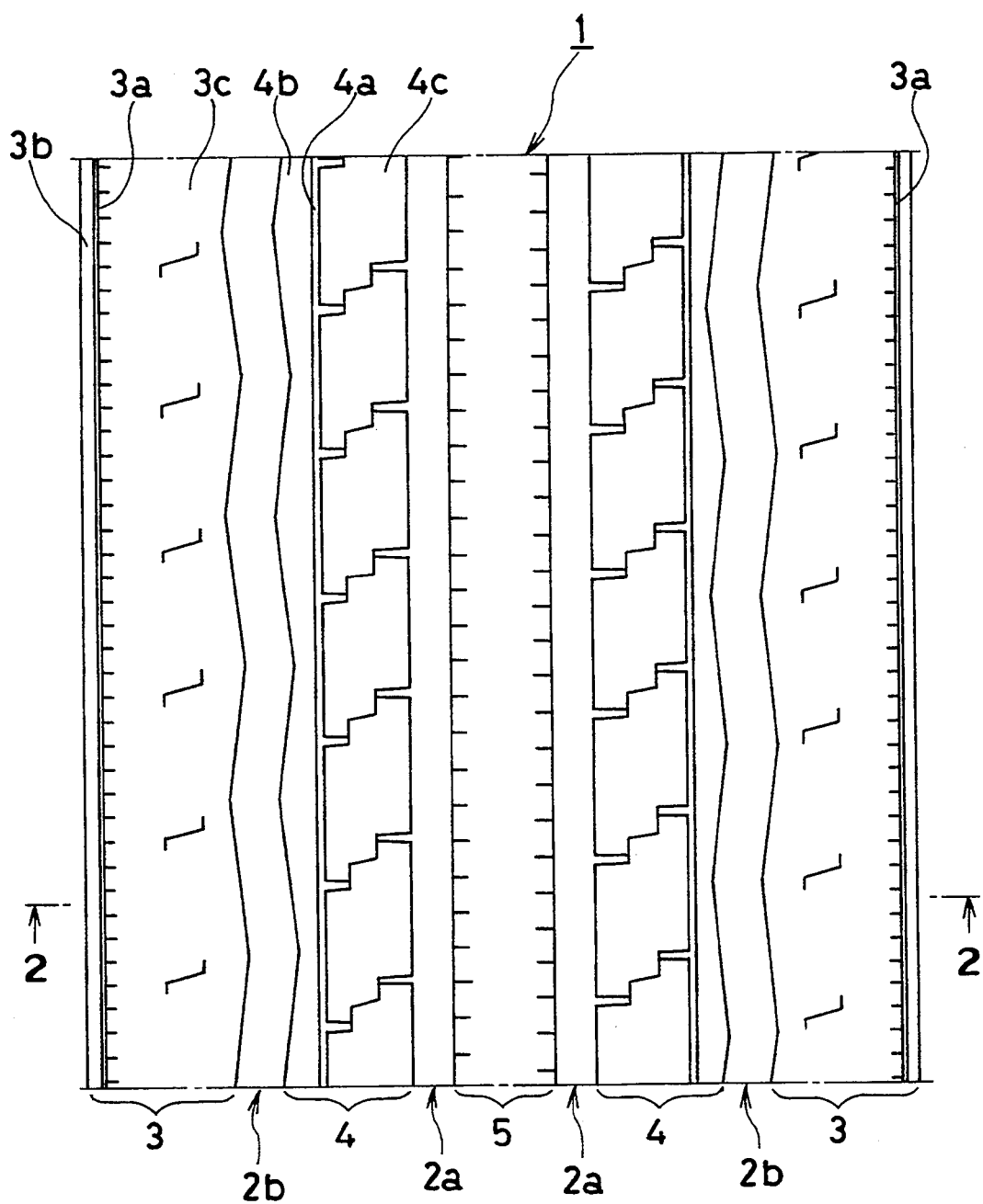
FIG. 1 is a development elevation showing a tread surface of the pneumatic radial tire for heavy loads according to the present invention.
Figure 2:
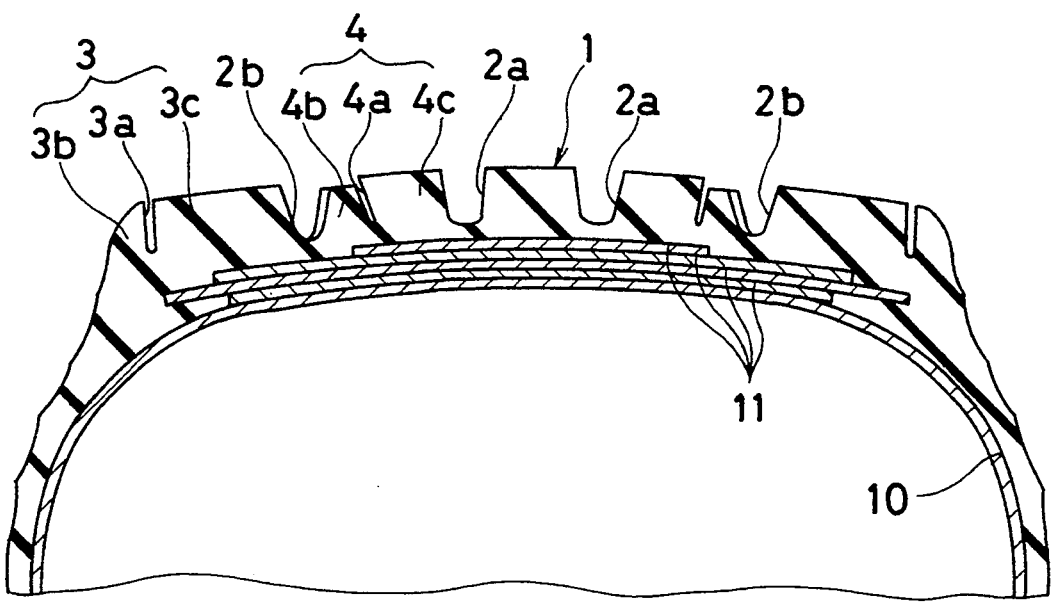
FIG. 2 is a sectional view taken along the line A—A in FIG. 1.

Referring to FIGS. 1 and 2, a reference numeral 10 denotes a carcass layer, and 11 four belt layers comprising steel cords and inserted between the carcass layer and a tread. A tread surface 1 is provided with two inner straight main grooves 2a extending in the circumferential direction of the tire, and two outer zigzag main grooves 2b, to thereby form shoulder ribs 3 on the left and right shoulder portions, middle ribs 4 at the immediate inner side of the shoulder ribs 3, and a center rib 5 on the central portion of the tread. The main grooves 2a, 2b may have either a U-shaped cross section or a V-shaped cross section.

The ribs 3, 4, 5 are provided suitably with kerfs extending in the widthwise direction of the tire. Each shoulder rib 3 is provided in a shoulder side edge portion thereof with a narrow groove 3a so that the narrow groove 3a extends straight and continuously in the circumferential direction of the tire, and it comprises a narrow rib 3b and a rib body 3c which are separated by the narrow groove 3a. Each middle rib 4 is provided in a shoulder side edge portion thereof with a straight narrow groove 4a so that the narrow groove 4a extends continuously in the circumferential direction of the tire, and it comprises a narrow rib 4b and a rib body 4c which are separated by the narrow groove 4a.

Figure 3:
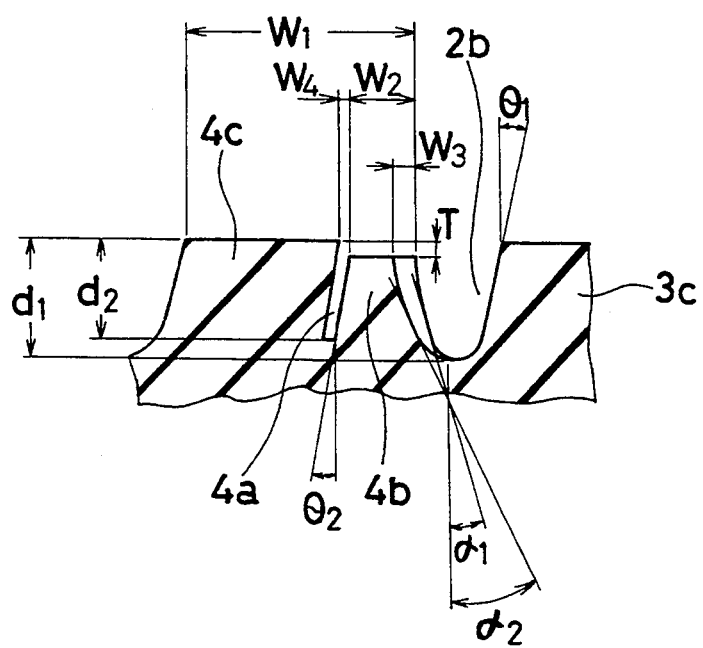
FIG. 3 is a partial enlarged section of what is shown in FIG. 2.

As shown in FIG. 3, the narrow groove 4a has a width $W_4$ set to 0.5–1 mm, and the axis thereof in the direction of the depth is inclined downwardly inward with respect to a normal line of the tread surface 1. The narrow groove 4b is provided so as to extend continuously in the circumferential direction of the tire and have a smaller height so that a height difference T between the narrow groove 4b and the rib body 4c becomes 2–4 mm. Since the narrow rib 4b is adjacent to the zigzag-shaped main groove 2b the width thereof at the tread surface varies in the circumferential direction of the tire by a level in the range from a maximum width thereof $W_2$ and a minimum width thereof ($W_2-W_3$), i.e., in the range of a difference $W_3$ between the apexes of adjacent projecting and recessed portions of the zigzag edge of the rib 4b, and the level of the maximum width $W_2$ with respect to that of a total width $W_1$ of the rib 4 is set so as to satisfy the formula $W_2/W_1 \leq 0.3$. An angle $\alpha_1$ between the side surface which faces the relative main groove 2b of a maximum width portion of the narrow rib 4b and a normal of the tread surface 1 is set smaller than an angle $\alpha_2$ between the side surface which faces the relative outermost main groove 2b of a minimum width portion of the narrow rib 4a and the same normal.

In such a pneumatic radial tire for heavy loads, the rigidity of the belt layers 11 comprising steel cords inserted between the tread and carcass layer is very high, so that the outermost main grooves 2b constitute inflection points during inflation to cause the shoulders to fall. However, since the narrow grooves 4a extending continuously in the circumferential direction of the tire are provided as mentioned above at the shoulder side edge portions of the ribs 4 which are axially inward and adjacent to the main grooves 2b, the variation of rigidity of the tread in the widthwise direction thereof becomes moderate to prevent inflection points from occurring in the main grooves 2b, so that a difference in diameter between the central portion of the tread and shoulders during inflation becomes smaller. Since a dragging frictional force exerted on the shoulders due to this diameter difference can therefore be reduced, the partial abrasion of the shoulder ribs 3 can be relatively minimized.

Since a narrow rib 4b the height of which is smaller than that of a rib body 4c is provided at the shoulder side edge portion of a rib 4 axially inward and adjacent to the outermost main groove 2b, a difference in radius of rotation occurs between the rib body 4c and narrow rib 4b due to a difference in the amount of abrasion thereof. Therefore, a dragging frictional force ascribable to a diameter difference occurs in the narrow rib 4b. Consequently, an abrasion promoting force can be concentrated on the narrow rib 4b, and this enables the partial abrasion of the tire, such as shoulder dropping abrasion thereof to be effectively minimized.

Furthermore, the narrow rib 4b has a height difference T with respect to the rib body 4c, so that a draining passage can be secured owing to a clearance occurring due to this height difference T. Moreover, since an angle $\alpha_1$ of the side surface of a maximum width portion of the narrow rib 4b is smaller than that $\alpha_2$ of the side surface of a minimum width portion thereof, the draining performance of the tire is improved, and this enables the occurrence of a hydroplaning phenomenon to be prevented.

According to the present invention, the width $W_4$ of a narrow groove 4a provided in a rib 4 axially inward and adjacent to the outermost main groove 2b is set to 0.5–1 mm. The lower limit of 0.5 mm of the width $W_4$ of this groove is determined on the basis of the strength of the narrow groove molding ribs of a tire producing metal mold. When the width $W_4$ is set lower than this level, it becomes difficult to manufacture the tire. Conversely, when the width $W_4$ of the narrow groove 4a is set in excess of 1 mm, the distance between the rib body 4c and narrow rib 4b becomes too large to obtain a protecting effect (interaction) of the rib body 4c, and the partial abrasion minimizing effect mentioned above cannot be obtained. Although the depth $d_2$ of the narrow groove 4a is not specially limited, it is preferably set equal or smaller than that $d_1$ of the main groove 2b ($d_2 \leq d_1$).

A maximum width $W_2$ of the narrow rib 4b is set with respect to a total width $W_1$ of the rib 4 so that it satisfies the formula $W_2/W_1 \leq 0.3$. When $W_2/W_1 > 0.3$, a difference between the rigidity of the rib body 4c and that of the narrow rib 4b becomes small, so that it becomes difficult to concentrate an abrasion promoting force on the narrow rib $4b$. Such a narrow rib $4b$ becomes liable to be chipped off during the manufacturing of the tire or during the travelling of the vehicle. The axis of the narrow groove $4a$ is therefore inclined downwardly inward with respect to a normal of the tread surface 1 so that the thickness of the base end portion of the narrow rib $4b$ becomes larger than that of the free end portion thereof. An angle $\theta_2$ between the axis of the narrow groove $4a$ and a normal of the tread surface 1 is preferably set to more than 0° and not more than 10° ($0° < \theta_2 \leq 10°$).

The side surface (groove-defining wall) which faces the main groove $2b$ of the narrow rib $4b$ is formed so as to extend zigzag in the circumferential direction of the tire, whereby the width of the rib varies cyclically between a maximum width $W_2$ and a minimum width ($W_2$-$W_3$). When $W_2/W_1 \leq 0.3$, and, when the rigidity of the rib $4b$ thereby becomes too low, the effect in preferentially wearing the narrow rib $4b$ decreases. However, a sufficiently high rigidity of the narrow rib $4b$ can be secured by forming the main groove-side surface of the rib $4b$ in zigzags as mentioned above.

When the surface on the side of the main groove of the narrow rib $4b$ is formed in zigzags, there is the possibility that the draining performance of the tire is spoiled. However, according to the present invention, a tangential line on which the zigzag surface of the main groove $2b$ meets the bottom surface thereof can be set linear by setting an angle $\alpha_1$ between the side surface which faces the relative main groove $2b$ of a maximum width portion of the narrow rib $4b$ and a normal of the tread surface 1 smaller than that $\alpha_2$ between the side surface which faces the relative main groove $2b$ of a minimum width portion of the narrow rib $4a$ and the same normal, i.e., by setting $\alpha_2 > \alpha_1$. Therefore, the draining characteristics of the main groove $2b$ can be improved, whereby the draining performance of the tire can be improved.

A height difference T between the narrow rib $4b$ and rib body $4c$ is preferably set to 2–4 mm. The reason resides in that, when the height difference T is less than 2 mm, the draining performance of the tire cannot be improved, and in that, conversely, when this height difference is set in excess of 4 mm, a dragging frictional force ascribable to a diameter difference hardly occurs, so that a partial abrasion minimizing effect cannot be obtained.

The angle $\alpha_1$ of the narrow rib $4b$ is preferably set larger than an angle $\theta_1$ between the side surface which is on the side of the main groove $2b$ of the shoulder rib 3 and a normal of the tread surface 1. When $\alpha_1 > \theta_1$, the angles of inclination of both side surfaces of the main groove $2b$ become different. Accordingly, even when a stone is caught in the main groove $2b$, it can be removed easily therefrom.

As described above, the present invention provides a pneumatic radial tire for heavy loads, having steel belt layers provided in a tread, and a tread pattern based on a rib pattern on a tread surface, characterized in that narrow grooves extending continuously in the circumferential direction of the tire are provided at the shoulder side edge portions of ribs axially inward and adjacent to left and right outermost main grooves, the width $W_4$ of these narrow grooves being set to a level in the range of 0.5–1 mm, the axes of the narrow grooves which extend in the direction of the depth thereof being inclined in the downwardly inward direction with respect to a normal of the tread surface, the narrow grooves forming separated rib bodies and narrow ribs the height of which is smaller than that of the rib bodies, the side surfaces which are on the side of the main grooves of the narrow ribs being formed so as to extend in zigzags, a ratio of a maximum width $W_2$ of the narrow ribs to a total width $W_1$ of the ribs adjacent to the main grooves being set to a level satisfying the relation $W_2/W_1 \leq 0.3$, an angle $\alpha_1$ between the side surface which faces the relative outermost main groove of a maximum width portion of each narrow rib and a normal of the tread being set smaller than an angle $\alpha_2$ between the side surface which faces the relative outermost main groove of a minimum width portion of each narrow rib and the same normal. Therefore, partial abrasion, such as shoulder dropping abrasion can be effectively minimized, and the draining performance of the tire can be improved.

EXAMPLES

Seven types of pneumatic radial tires for heavy loads, having common tire size and construction as described below, as well as a tread with a rib pattern of FIGS. 1–3 the size of each part of which set different, were manufactured.

Tire size: 11R22.5 14 PR
Construction of tires:
Carcass layer: A one-layer structure comprising steel cords arranged at 90° with respect to the circumferential direction of the tire. Belt layers: A laminated structure comprising four belts composed of steel cords wherein the angle of the cords in a carcass-contacting first layer with respect to the circumferential direction of the tire was set to $+57°$; the angle of the cords in a second layer to $+18°$; the angle of the cords in a third layer to $-18°$; and the angle of the cords in a fourth layer to $-18°$.

Tire according to the present invention:
Width of a main groove $2b$: 13 mm (extending in zigzags)
Width $W_4$ of a narrow groove $4a$: 1 mm
Angle $\theta_2$ of a narrow groove $4a$: 10°
Total width $W_1$ of a rib 4: 30 mm
Maximum width $W_2$ of a narrow rib $4b$: 9 mm ($W_2/W_1 = 0.3$)
Angle $\alpha_1$ of a narrow rib $4b$: 6°
Angle $\alpha_2$ of a narrow rib $4a$: 10° ($\alpha_2 > \alpha_1$)

Comparative tire 1:
Identical with the tire according to the present invention except that a main groove $2b$ was formed so as to external straight.

Comparative tire 2:
Identical with the tire according to the present invention except that the width $W_4$ of a narrow groove $4a$ was set to 1.5 mm.

Comparative tire 3:
Identical with the tire according to the present invention except that the angle $\theta_2$ of a narrow groove $4a$ was set to 0°.

Comparative tire 4:
Identical with the tire according to the present invention except that $W_2/W_1$ was set to 0.4.

Comparative tire 5:
Identical with the tire according to the present invention except that $\alpha_2$ was set to satisfy $\alpha_2 = \alpha_1$.

Conventional tire:

Identical with the tire according to the present invention except that narrow grooves 4a and narrow ribs 4b were not provided to ribs 4.

The partial abrasion resistance and draining performance of these seven types of tires were evaluated by using the following test methods, and the results are shown in Table 1.

Partial abrasion resistance test:

The depths of the main grooves 2a, 2b in each test tire were measured in millimeters to one place of decimal before and after a real vehicle to the rims of which the test tires had been fitted travelled 50,000 km on a regular pavement, and a difference between the measurement values of the respective grooves obtained before the vehicle had thus travelled and those of the respective grooves obtained after the vehicle had travelled were determined as amount of abrasion, and a difference between thee amount of abrasion of the main groove 2a and that of abrasion of the main groove 2b was calculated and determined as amount of partial abrasion. The travelling distance (50,000 km) was then divided by this amount of abrasion to determine a travelling distance per unit amount of abrasion of 1 mm, on the basis of which the partial abrasion resistance of each tire was evaluated. The results are shown by indexes based on 100 which represents the partial abrasion resistance of a conventional tire. The larger indexes indicate higher partial abrasion resistance.

Draining performance test:

Water was scattered on the road surface on a test course so that the depth of the water became around 1 mm. The test tires were fitted on the rims of a real vehicle. While the vehicle travelled on this road surface at 60 km/h, the brakes were applied, and the braking distance was then measured. The draining performance of the tires was evaluated on the basis of a reciprocal of this measurement value. The results of the evaluation are shown by indexes based on 100 which represents the draining performance of a conventional tire. The larger indexes indicate higher draining performance.

TABLE 1

| | Partial abrasion resistance | Draining performance |
|---|---|---|
| Conventional tire | 100 | 100 |
| Tire according to the present invention | 110 | 110 |
| Comparative tire 1 | 105 | 110 |
| Comparative tire 2 | 103 | 110 |
| Comparative tire 3 | 99 | 110 |
| Comparative tire 4 | 97 | 110 |
| Comparative tire 5 | 108 | 95 |

As is clear from Table 1, the tire according to the present invention was superior to the conventional tire in both the partial abrasion resistance and draining performance. The partial abrasion resistance of all of the comparative tires 1–4 which are out of the scope of the present invention is inferior to that of the present invention. Especially, in the comparative tire 3 in which the angle $\theta_2$ of narrow grooves 4a was set to 0°, the narrow ribs 4b was chipped off. The comparative tire 5 in which the angle $\alpha_2$ was set to satisfy $\alpha_2 = \alpha_1$, was inferior in the draining performance to the conventional tire.

What is claimed is:

1. A pneumatic radial tire for heavy loads, having steel belt layers provided on the inner side of a tread, and a tread pattern having a plurality of divisional ribs separated by a plurality of main grooves extending in the circumferential direction of said tire, characterized in that at least the axially inner vertical surfaces of left and right outermost main grooves out of said main grooves are formed so as to extend zigzag in the circumferential direction of said tire, straight narrow grooves which extend continuously in the circumferential direction of said tire being provided at the shoulder side edge portions of ribs axially inward and adjacent to said outermost main grooves, the width $W_4$ of said narrow grooves being set to a level in the range of 0.5–1 mm, the axes of said narrow grooves which extend in the direction of the depth thereof being inclined in the downwardly inward direction with respect to a normal of said tread surface, said narrow grooves forming laterally separate rib bodies and narrow ribs having a height which is smaller than that of said rib bodies and an axially outer edge which extends in a zigzag line in the circumferential direction of the tire, a ratio of a maximum width $W_2$ of said narrow ribs to a total width $W_1$ of said ribs on the axially inner side of said outermost main grooves being set to a level satisfying the relation $W_2/W_1 \leq 0.3$, an angle $\alpha_1$ between the side surface which faces the relative outermost main groove of a maximum width portion of each narrow rib and a normal of said tread surface being set smaller than an angle $\alpha_2$ between the side surface which faces the relative outermost main groove of a minimum width portion of each narrow rib and said normal whereby a circumferential tangential line of which a zigzag side surface on each said outermost main groove meets a bottom surface thereof extends linearly.

2. A pneumatic radial tire for heavy loads according to claim 1, wherein an angle $\theta_2$ of each of said narrow grooves with respect to a normal of said tread surface is set to more than 0° and not more than 10°.

3. A pneumatic radial tire for heavy loads according to claim 1, wherein a difference between the height of each of said narrow ribs and that of each of said rib bodies is set to 2–4 mm.

4. A pneumatic radial tire according to claim 1, wherein said angle $\alpha_1$ is set larger than an angle $\theta_1$ between the side surface on the side of the main groove of the shoulder rib and a normal of the tread surface.

* * * * *